United States Patent [19]

van der Lely

[11] 4,387,910
[45] Jun. 14, 1983

[54] COUPLING MEMBER

[76] Inventor: Cornelis van der Lely, 7, Brüschenrain, Zug, Switzerland

[21] Appl. No.: 197,341

[22] Filed: Oct. 15, 1980

Related U.S. Application Data

[63] Continuation of Ser. No. 910,903, May 30, 1978, abandoned.

[51] Int. Cl.³ .............................................. B60D 7/02
[52] U.S. Cl. .................................. 280/449; 172/439; 188/313; 280/461 A
[58] Field of Search ........................ 280/449, 461 A; 180/14.5; 188/299, 300, 311, 312, 313, 314, 319; 172/261, 439

[56] References Cited

U.S. PATENT DOCUMENTS

| | | | |
|---|---|---|---|
| 2,405,980 | 8/1946 | Sands | 172/439 |
| 2,723,007 | 11/1955 | Lanphere | 188/313 |
| 3,033,323 | 5/1962 | Manna | 188/313 |
| 3,143,180 | 8/1964 | Davis | 180/14.5 |
| 3,376,958 | 4/1968 | Carr | 188/316 |
| 3,889,969 | 6/1975 | Otani | 188/1 C |
| 3,905,425 | 9/1975 | Jackson | 188/300 |
| 3,929,057 | 12/1975 | Kondo | 188/300 |
| 4,049,239 | 9/1977 | Howell | 188/313 |

*Primary Examiner*—Joseph F. Peters, Jr.
*Assistant Examiner*—Ross Weaver
*Attorney, Agent, or Firm*—Penrose Lucas Albright

[57] ABSTRACT

An overload coupling member is used as a strut to interconnect the upper link of a tractor lift device with an implement, such as a cultivator. The member includes two portions that are moved towards one another upon overload to allow the implement to pivot upwardly on the other two links. One portion has an inner end sleeve pivoted to a further sleeve on the other portion's inner end and relative movement between the two portions is prevented by a shear pin that extends into an opening of the sleeves. Upon overload, the pin shears and the portions jack-knife until the lift raises the implement past the obstacle and the implement is then lowered. The inner opening end is normally closed by an abutment member, but when the portions are pivoted, the opening is exposed and a severed pin portion falls out. The shear pin can have a number of severable portions and be spring biased to slide in a holder and establish rigid connection between the two portions a number of times. In another version, the portions can be a cylinder and a piston with rod respectively. On either side of the piston fluid spaces are interconnected through a circuit having a pressure relief valve. The valve is biased by a spring that can be set to yield when the pressure exceeds a predetermined value. A by-pass conduit also allows movement of fluid from one space to the other accompanied by the movement of the piston in the cylinder. Thus, a set screw in the conduit can be used to open the conduit until the portions are set in desired relative positions and the member has the correct overall length.

11 Claims, 8 Drawing Figures

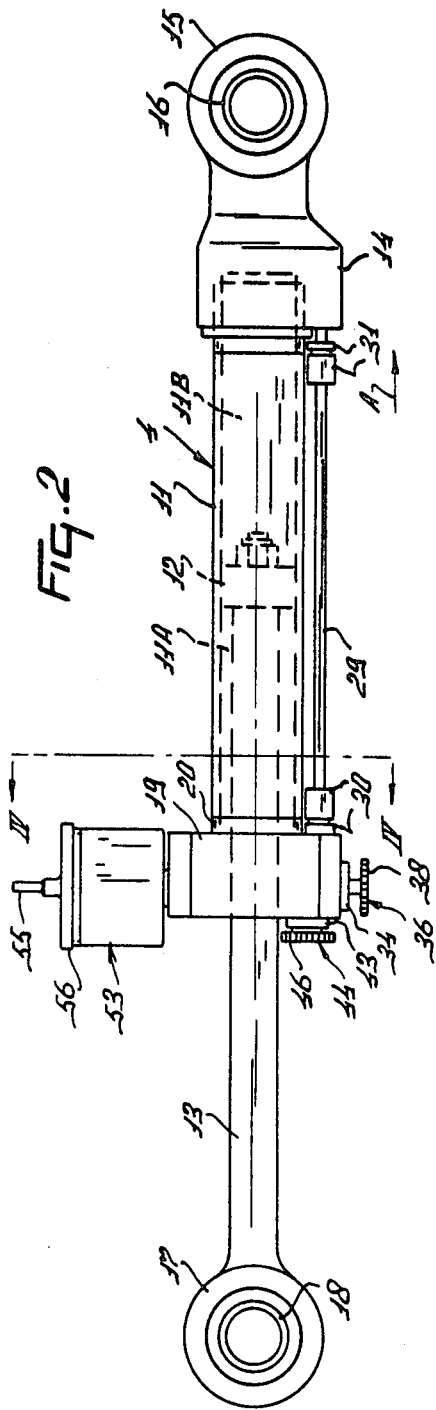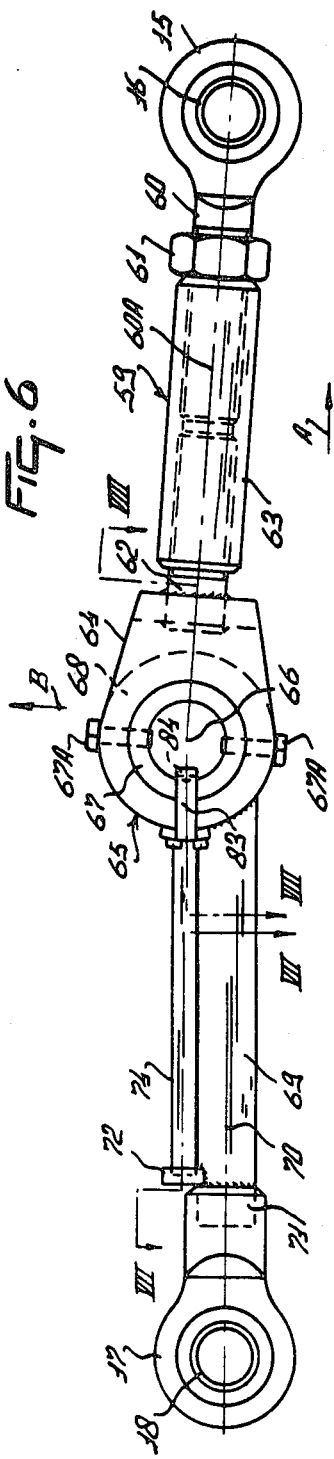

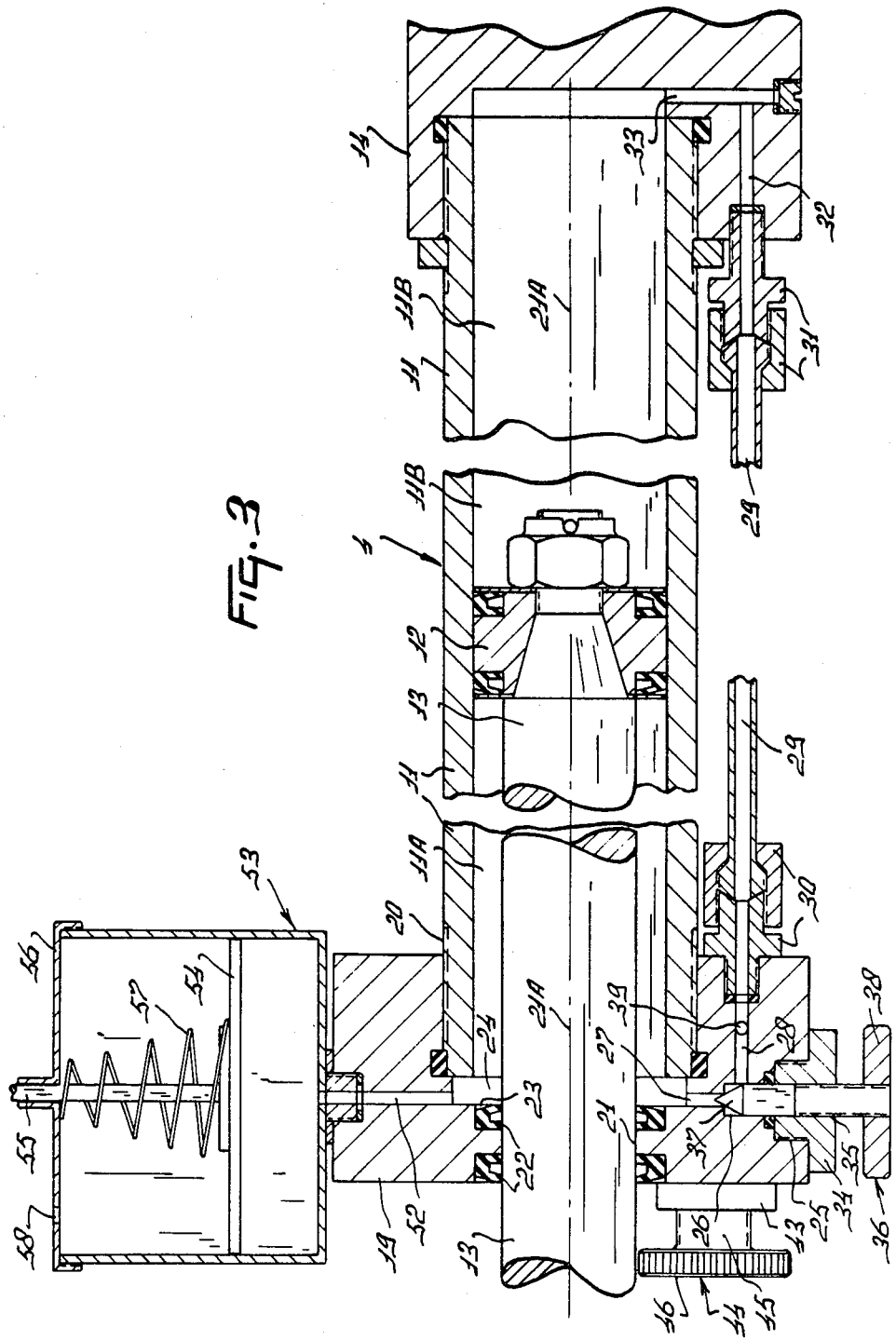

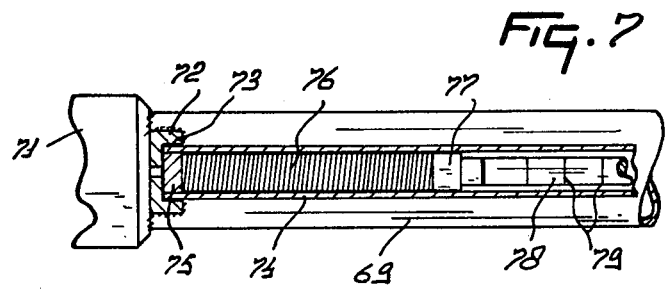
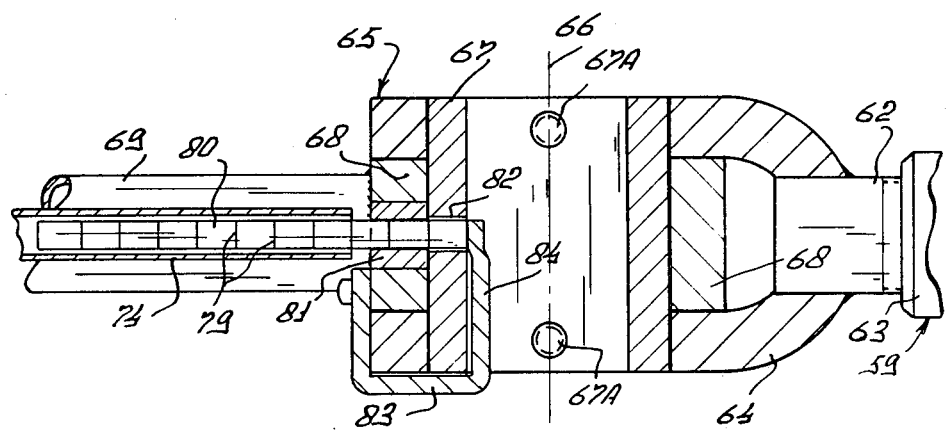

COUPLING MEMBER

This is a continuation application of Ser. No. 910,903 filed May 30, 1978, now abandoned.

SUMMARY OF THE INVENTION

The invention relates to a coupling member.

According to a first aspect of the present invention there is provided a coupling member comprising two portions each of which has attachment means for attachment to a respective coupling location, the two portions being interconnected, in normal operation, substantially rigidly, and being displaceable relatively to one another, after overload of the coupling member, to permit the distance between the attachment means to alter.

According to a second aspect of the present invention there is provided a coupling member comprising two portions which are rigidly interconnected in normal operation by a shear pin, the two portions being relatively displaceable after fracture of the shear pin due to overload of the coupling member.

According to a third aspect of the present invention there is provided a coupling member comprising two portions which are rigidly interconnected in normal operation by locking means, the locking means comprising a hydraulic circuit in which, in normal operation, the fluid pressure is a function of the operational force exerted on the member, a pressure relief valve being provided which determines a limit value of the fluid pressure which, when exceeded, results in unlocking of the locking means to allow relative displacement of the two portions.

According to a fourth aspect of the present invention there is provided, in combination, a tractor and an agricultural implement which are interconnected by a coupling member comprising two portions connected respectively to the tractor and to the implement, the two portions being interconnected, in normal operation, substantially rigidly, and being displaceable relatively to one another, after overload of the coupling member, to permit the machine to move relatively to the tractor.

DESCRIPTION OF THE PREFERRED EMBODIMENTS

For a better understanding of the present invention and to show how it may be carried into effect, reference will now be made, by way of example only, to the accompanying drawings, in which:

FIG. 2 is a side elevation of part of the three-point lifting device;

FIG. 3 is an enlarged longitudinal sectional view of the part shown in FIG. 2;

FIG. 6 is a side elevation of part of a second embodiment of three-point lifting device;

FIG. 7 is a sectional view taken on the lines VII—VII in FIG. 6; and

FIG. 8 is a sectional view taken on the lines VIII—VIII in FIG. 6.

Figure 1:
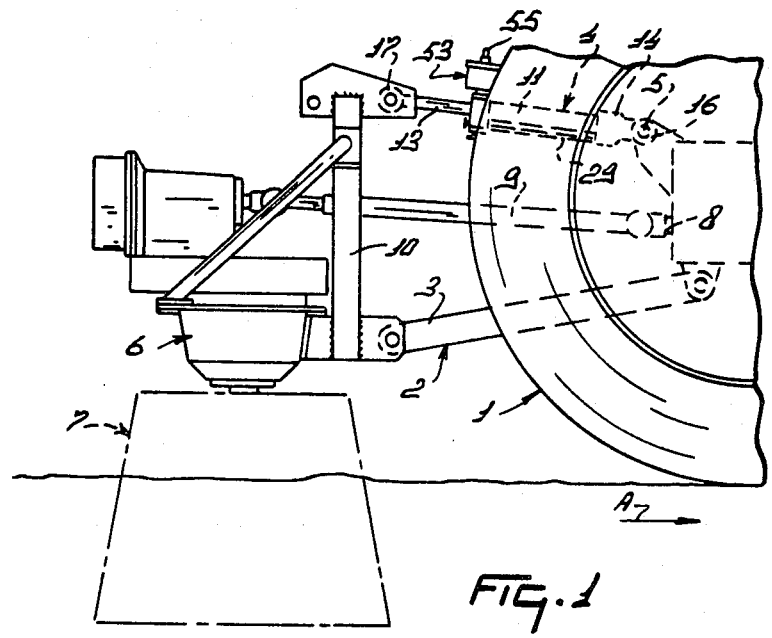
FIG. 1 is a side elevation of part of a tractor having a three-point lifting device which supports an implement.

FIG. 1 shows the rear part of a tractor 1 which is provided with a three-point lifting device 2. The lifting device 2 comprises two adjacent lower lifting arms 3, which can be turned together with respect to the tractor frame in a manner not shown by the hydraulic system of the tractor. The lifting device 2 also comprises a coupling or top rod 4, which is mounted pivotably at the front, with respect to the intended direction of operative travel of the tractor 1, indicated by an arrow A, about a horizontal pivotal shaft 5 fastened to the tractor frame and extending transversely of the direction A. The top rod 4, like each of the two lower lifting arms, is provided at the rear with a coupling point for connection to an agricultural implement to secure the implement to the tractor 1. In the embodiment shown in FIG. 1, the lifting device 2 has attached to it a harrow to having a plurality of soil working members in the form of rotors 7 which are provided with tines and are driven by means of an auxiliary shaft 9, which is connected with the power take-off shaft 8 of the tractor. The harrow 6 is provided with a trestle 10, which has the shape of an inverted V or U, as viewed in the direction A, the top rod 4 being connected near the top of the trestle 10 and the lower lifting arms 3 being connected at the two lower ends.

The top rod 4 is shown in detail in FIGS. 2 to 5. The top rod 4 comprises a locking device having a cylinder 11 in which a piston 12 is axially movable. This piston 12 is mounted on a piston rod 13, which projects only from the rear end of the cylinder 11, with respect to the direction A (FIG. 2). The cylinder 11 constitutes a first coupling member and the piston rod 13 a second coupling member of the locking device. The cylinder 11 has at the front end portion 14 which is provided with a fastening member in the form of an eyelet 15, in which a bearing 16 is arranged for engagement with the pivotal shaft 5. The piston rod 13 is provided at its end away from the piston 12 with a fastening member in the form of an eyelet 17 in which a bearing 18 is fitted. The bearing 18 receives a rod which extends substantially parallel to the pivotal shaft 5 and is part of the topmost connecting point of the trestle 10.

At the end away from the end portion 14, the cylinder 11 has an end portion 19, which is fitted to the end of the cylinder 11 by means of a screwthread 20 (FIG. 3). The end portion 19 has a bore 21 in which the piston rod 13 is slidable. The centerline 21A of the bore 21 coincides with the centerline of the cylinder 11. The bore 21 has, at each end, seals 22 surrounding the piston rod 13.

The end portion 19 also has a cylindrical recess 23, the centreline of which also coincides with the centerline of the cylinder 11. The cylindrical surface of the recess 23 constitutes an extension of the screwthread 20 on the end portion 19 surrounding the cylinder 11. The end wall of the recess 23 extends perpendicular to the centerline of the bore 21 and is located at a short distance behind the end face of the cylinder 11 to provide a space 24. The space 24 communicates with the space 11A provided between the inner surface of the cylinder 11 and the outer surface of the piston rod 13.

The cylindrical outer surface of the end portion 19 has a tapped bore 25. The bore 25 is extended in the direction towards the centerline 21A by a bore 26 which is disposed so that the centerline of the bores 25 and 26 coincide and are perpendicular to the centerline 21A of the bore 21. The bore 26 communicates through a bore 27 with the space 24; the bore 27 is coaxial with the bores 25 and 26. The bore 26 communicates through a bore 28, which is parallel to the bore 21, with a conduit 29. The conduit 29 is also parallel to the centerline 21A and is in liquid-tight engagement with the end portion 19 by virtue of coupling pieces 30. The conduit 29 is connected at the end away from the end portion 19 with the end portion 14 by coupling pieces 31 so that the interior of the conduit 29 communicates with a bore 32 in the end portion 14, which is also parallel to the centerline 21A. The bore 32 opens out in a bore 33, which is perpendicular to the centerline 21A, this bore 33 communicating with a portion 11B of the interior of the cylinder 11.

The bore 25 receives a guide member 34 having an external screwthread co-operating with the screwthread in the bore 25. The guide member 34 has an uninterrupted tapped hole 35. The hole 35 receives a set screw 36, the stem of which has an external screwthread co-operating with the screwthread of the hole 35. The set screw 38 has a conical end 37 which, over its whole circumference, is in contact with the transitional area between the bores 26 and 27, at least in the position shown, these bores being thus separated from one another. The set screw 36 has an adjusting knob 38.

Figure 5:
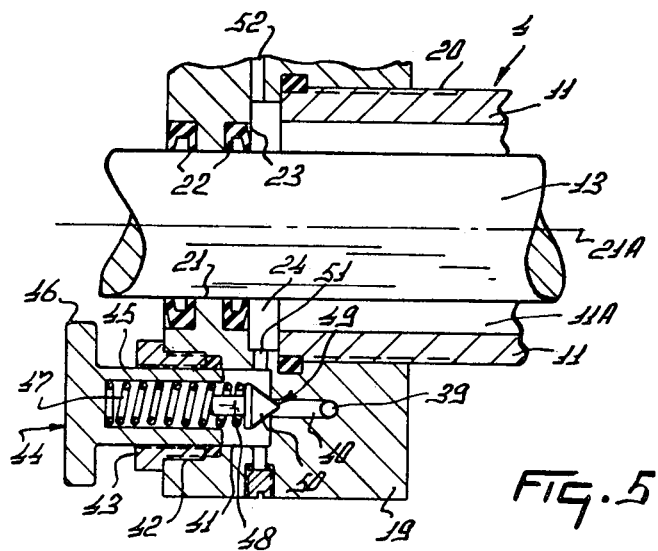
FIG. 5 is a sectional view taken on the lines V—V in FIG. 4.
Figure 4:
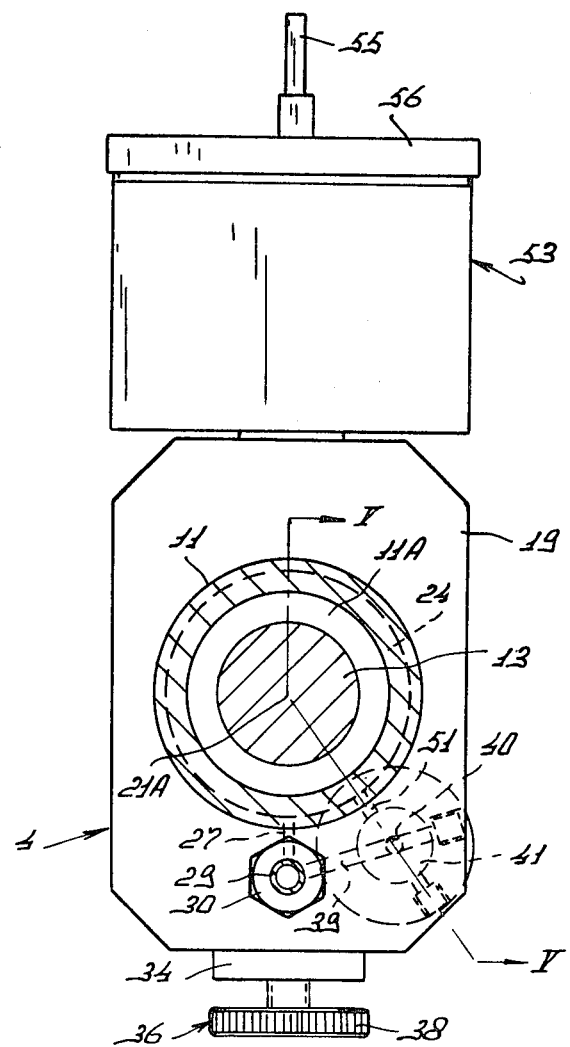
FIG. 4 is a sectional view taken on the lines IV—IV in FIG. 2.

The end portion 19 also has a bore 39, which is perpendicular to the centerline 21A and is inclined by an acute angle to the plane containing the centerline of the bores 21 and 28 (FIGS. 3 and 4). The bore 39 opens out at one end into the bore 28 (FIG. 3). Some distance from the bore 28, the bore 39 opens into a bore 40, the centerline of which is parallel to the centerline 21A (FIG. 5). The bore 40 opens out, at its end furthest from the end portion 14, in a bore 41, which is coaxial with the bore 40 but is a few times larger in diameter than the bore 40. The bore 41 opens out at the end face of the end portion 19 facing away from the end portion 14. The cylindrical surface of the bore 41 has a screwthread 42 over part of its length, which receives a guide member 43 with an external screwthread over part of its length, which co-operates with the thread 42. The guide member 43 also has an internal screwthread receiving an adjusting member 44. The part of the adjusting member 44 facing the bore 40 has a hollow cylindrical part 45, the interior of which communicates with the interior of the bore 41. The interior of the cylindrical part 45 is closed at its end away from the bore 40 by an adjusting knob 46. The adjusting knob 46 has a dial from which to read the setting of the limit value of the fluid pressure or force at which a valve 49 opens. The interior of the part 45 accommodates a compression spring 47 which at one end bears on the inner side of the adjusting knob 46 and at the other end surrounds a stem 48 of the adjustable pressure limiting valve 49. The valve 49 has a conical end 50, which in normal operation is in contact with the transitional area between the bores 40 and 41, which are thus separated from one another. The bore 41 communicates through a bore 51 with the space 24 (FIG. 5).

From FIG. 3 it will be appreciated that the end portion 19 has a bore 52, which is coaxial with the bore 27. The bore 52 opens out into the interior of a reservoir 53 on the top of the end portion 19. In the reservoir 53 there is a piston 54 which is a close fit in the inner wall of the reservoir 53. The piston 54 has a guide rod 55, which projects from the reservoir through an opening in a cover 56. Between the inner surface of the cover 56 and the top surface of the piston 54 there is a light compression spring 57. The cover 56 has an opening 58 for providing communication between the space between the inner surface of the cover 56 and the top surface of the piston 54 with the open air.

Hydraulic fluid fills the hydraulic circuit including the spaces 11A and 11B in the cylinder 11 on both sides of the piston 12, the space 24, the bore 27, part of the bore 26, the bore 28, the conduit 29, the bores 32 and 33, the bores 39, 40, 41, 51, 52 and the space in the reservoir 53 below the piston 54. The bores 27, 26, 28 constitute a by-pass or parallel communication with respect to the bores 39, 40, 41 and 51.

In normal operation the eyelet 15 of the top rod 4 is engaged by the pivotal shaft 5 secured to the tractor frame and the eyelet 17 is engaged by a rod secured to the upper junction of the trestle 10 of the agricultural implement attached to the tractor. In normal operation the set screw 36 prevents communication between the bores 27 and 28 (this is the position shown in FIG. 3). The compression spring (FIG. 5) presses the conical end 50 of the valve 49 into the entry of the bore 40. The force with which the valve 49 is pressed into the bore 40 can be adjusted by turning the adjustment knob 46, which then moves axially with respect to the guide member 43 owing to the threaded connection between said two parts.

From the position shown in FIG. 2 of the piston 12 with respect to the cylinder 11, the piston 12 and the piston rod 13 can be pushed towards the end portion 14 by overload resulting from a force exerted in operation on the implement, and this force can be such that a locking device and an overload safety device are desirable. The top rod 4 described above comprises such a device. If the piston 12 is pushed towards the end portion 14 with a force approaching the adjusted overload value, the fluid pressure in the space 11B between the piston 12 and the end portion 14 will reach a given high value as will the fluid pressure in the bores 33, 32, the conduit 29, the bore 28 and the bores 39 and 40. If the adjusted overload limit value is reached, the fluid pressure will lift the valve 49 against the set pressure of the spring 47 and the fluid can then flow from the bore 40 through the space 41 and the bore 51 into the space 11A around the piston rod 13 on the other side of the piston 12 from the space 11B, so that unlocking occurs. Since the volume of the space inside the cylinder 11 occupied by the piston 12 and the piston rod 13 increases when the piston 12 moves towards the end portion 14 (since the piston rod 13 projects only from one end of the cylinder 11), a quantity of hydraulic fluid corresponding to the volume of the extra length of the piston rod 13 has to be discharged. When the valve 49 is lifted in the event of overload a portion of the hydraulic fluid will flow through the conduit 52 towards the reservoir 53, which will move the piston 54 towards the cover 56 against the relatively light pressure of the spring 57. The piston 54 is provided to prevent the hydraulic fluid in the reservoir 53 from absorbing air or forming bubbles. The construction described thus prevents the occurence of excessive forces in the top rod of the lifting device and hence in other structural parts of the agricultural implement and the tractor. It is of great advantage that unlocking of the locking device can be achieved solely by the operational force exerted on the implement 7 and is independent of the hydraulic system of the tractor. In order to set the position of an attached implement with respect to the tractor, the desired position of the piston rod 13 with respect to the cylinder 11 can be adjusted by screwing out the set screw 36. This provides communication between the bores 27 and 38 establishing a direct communication between the spaces 11A and 11B on the two sides of the piston 12. The piston rod 13 can then be moved manually, or by actuating the lifting device 2, into the desired position relative to the cylinder 11. After this setting the set screw 36 is tightened again so that the communication between the bores 27 and 28 is interrupted and the top rod can again respond only via the valve 49 to an overload limit value adjusted by the adjusting knob 46.

A second embodiment of a coupling rod for supporting an implement on a lifting device is shown in FIGS. 6 to 8. The coupling rod or intermediate shaft 59 comprises a spigot 60 connected with the eyelet 15 and having at its end away from the eyelet 15 a screwthread for receiving a nut 61. The centerline 60A of the spigot 60 coincides with the centerline of a spigot 62 located some distance from the spigot 60 and also having a screwthread. Disposed coaxially with the spigots 60 and 62 is an adjusting mechanism comprising a hollow shaft 63, having an internal screwthread co-operating with the external screwthreads on the two spigots 60 and 62. By turning the hollow shaft 63, the adjacent free ends of the spigots 60 and 62 can be moved towards and away from each other and can be fixed in position by the nut 61. Thus the length of the intermediate shaft 59 is variable. The spigot 62 is rigidly secured by its end away from the spigot 60 to a carrier 64 which is part of a shear-pin coupling 65. The carrier 64 (see FIG. 8) has a substantially U-shaped structure with two limbs which have a cyindrical bore with a centerline 66. The cylindrical bore receives a sleeve 67 which is rigidly secured by bolts 67A to the carriage 64. The sleeve 67 is surrounded between the limbs of the carrier 64 by a cylindrical sleeve 68, the centerline of which coincides with the centerline 66. The inner surface of the sleeve 68 engages the outer surface of the sleeve 67 and the sleeve 68 is retained axially between the limbs of the carrier 64. The sleeve 68 is rigidly secured on the side away from the region where the spigot 62 is fastened to a tube 69 of which the centerline 70 intersects, in normal operation, the centerline 62 at an acute angle of about 3° to about 10°, preferably about 6°. The end of the tube 69 remote from the sleeve 68 is connected by a socket 71 with the eyelet 17.

As shown in the elevational view of FIG. 6, the top side of the tube 69 has, near the socket 71, a support member 72 having a cavity 73 which receives the end part of a holder 74. The holder 74 is, in this embodiment, cylindrical and extends parallel to the centerline 70 to near the sleeve 68. The end part of the holder 74 located in the cavity 73 is closed by a plug 75. One end of a compression spring 76 located in the holder 74 abuts the plug 75. The end of the compression spring 76 away from the plug 75 exerts pressure on a pressure pin 77, which engages an elongate shear pin 78. The shear pin 78 extends from the pressure pin 77 in the holder 74 towards the sleeve 68. The shear pin 78 preferably has equispaced grooves 79 defining shear pin portions 80. In order to support the shear pin 78 the sleeve 68 has an annular cutting plate 81 of hardened steel, which closely surrounds the shear pin 78. One shear pin portion 80 of the shear pin 78 is located, in normal operation, in an opening 82 in the sleeve 67. In order to withstand cutting forces, the sleeve 67 is, in this embodiment, made from hardened metal, but the opening 82 may, as an alternative, be provided in a cutting plate comprising an insert in the sleeve 67. The shear pin portion 80 is located with some clearance in the opening 82. The sleeve 68 has, on the side connected to the tube 69, an abutment member 83 having a substantially U-shaped form, as shown in the sectional view of FIG. 8, and being shaped around the carrier 64 and the adjacent wall of the sleeve 67 so that one limb 84 projects into the interior of the sleeve 67, this limb 84 extending parallel to the centreline 66. The end of the limb 84 is positioned so that, in the normal operational position of FIG. 8, the free end of the limb 84 limits the movement of the pin 78 towards the spigot 62.

The embodiment of the intermediate shaft 59 shown in FIGS. 6 to 8 operates as fllows.

From the position of the intermediate shaft 59 shown in FIG. 6, in which the centerlines of the spigot 62 and the tube 69 intersect at a small angle, an overload due to excessive operational force exerted on the implement 7 can cause the implement to exert such a force on the lifting device 2 in the direction towards the eyelet 15 that the shear-pin coupling 65 breaks to interrupt the rigid connection between the spigot 62 and the tube 69. When the overload limit value determined by the choice of the shear pin 78 is reached, the shear-pin portion 80 located in the opening 82 will break off from the rest of the shear pin at the groove 79. Immediately after this fracture the two members of the shear-pin coupling, comprising the sleeve 68 as a first coupling member and the sleeve 67 as a second coupling member, will turn relative to one another about the centerline 66, this turn being caused by the force exerted by the implement pushing the eyelet 17 towards the eyelet 15. This turn causes the pivotal axis 66 to move in the direction of the arrow B in FIG. 6. During this movement the end portion of the limb 84 uncovers the opening 82 so that the opening 82 is fully open towards the space in the sleeve 67, and the broken off portion of the shear pin 80 can drop out. As the eyelets 15 and 17 move nearer to one another, the implement with the rotors 7 rises to eliminate the overload situation. The new end portion of the shear pin 78, urged by the compression spring 76 against the sleeve 67, can snap into the opening 82 only when the intermediate shaft 59 re-assumes the position shown in FIG. 6. To do this, the tractor driver raises the implement by means of the lifting device 2 so that a force in the direction opposite the force which caused the overload is exerted on the intermediate shaft 59, and the shear pin coupling then performs a movement in the direction opposite the arrow B. When the shear pin is opposite the opening 82, it snaps into the opening, the movement being limited by the free end of the limb 84, which again covers the opening 82 in the direction towards the pivotal axis 66 in this position of the two coupling members 67 and 68. In this position of the intermediate shaft, in which the shear pin occupies a new connecting position, the intermediate shaft is again capable of supporting the implement 6. Owing to its length the shear pin 78 can overcome an overload situation a great many times, the shear pin being each time moved into a new connecting position after overload. In order to regulate the position of the attached implement with respect to the tractor, the intermediate shaft can be lengthened or shortened by adjusting the spigots 60 and 62 by turning the hollow shaft 63. When the shear pin 78 is fully consumed, the holder 74 can be readily taken out of the cavity 73, which constitutes a quick-action joint, after which a new shear pin can be inserted into the holder.

The construction described may be applied not only to the top rod described above, but also to other kinds of coupling rods establishing a connection between an agricultural implement and a tractor, for example, at the lower lifting arms 3. It can also be applied to machinery other than agricultural machinery. It will also be appreciated that the two described constructions could be combined to produce a construction in which a shear pin is provided with conjunction with hydraulic locking means.

While various features of the coupling members will be set forth in the following claims as inventive features, the invention is not necessarily limited to these features and is intended to encompass all disclosed inventive features both individually and in various combinations.

I claim:

1. An overload strut member adapted to be connected between two elements, said member comprising a cylinder, means adapted to connect said cylinder to one of said elements, a solid piston received within said cylinder that defines two fluid spaces within said cylinder, means adapted to connect said piston to the second of said elements, hydraulic means retaining said piston and cylinder in a relatively fixed position to establish the overall set length of said strut member until overload, said hydraulic means including a hydraulic passageway interconnecting said spaces and a one way pressure relief valve in said passageway, said piston having a rod that extends through a first of said spaces and a reservoir being in communication with said first space, said relief valve opening responsive to a predetermined hydraulic pressure in said second space to permit the sliding movement of said piston within said cylinder and change in the length of said member, and bypass valve means for selectively allowing hydraulic flow between said spaces to vary the overall set length of said member when open and to lock said cylinder at a fixed length when closed, said relief valve allowing movement only when said predetermined pressure is exceeded.

2. A member as claimed in claim 1, in which said relief valve is displaceable against spring means and said spring means is adjustable.

3. A member as claimed in claim 1, in which said cylinder is fixed and the piston is displaceable relative to the cylinder.

4. A member as claimed in claim 1, in which said first space is located in the cylinder adjacent an end thereof and that space is in open communication with said reservoir.

5. A member as claimed in claim 2, in which said relief valve comprises an adjusting knob and spring means that exerts adjustable spring pressure on the valve.

6. An agricultural implement connected to the lifting device of a tractor with coupling means including an upper strut member, said member comprising a cylinder and solid piston which are normally held in relative fixed position by overload means, said overload means comprising a hydraulic circuit that includes a reservoir, a space with fluid at each side of said piston to normally prevent sliding movement of the piston and set the overall length of the strut member, the two spaces being in fluid communication with one another through an overload passageway in said circuit, a one way pressure relief valve in said circuit communicating fluid between said spaces and said reservoir upon being subjected to pressure overload and permitting sliding movement of said piston in said cylinder accompanied by a change in the overall length of said strut member, said relief valve and part of said passageway being located adjacent one end of said cylinder, a by-pass in the circuit establishing further communication between said spaces, said by-pass being located in said one end and being normally closed by by-pass valve means in said by-pass, said by-pass valve means including a setting mechanism that is externally mounted on said one end and said setting member being operable to allow fluid flow between said spaces via the by-pass so that the overall set length of the strut member can be changed when said by-pass valve means is open and said cylinder and piston are locked in a fixed relative position so that the length of the strut member is fixed when said by-pass valve means is closed, said relief valve permitting said sliding movement only after having been subjected to said overload pressure in said circuit.

7. An implement as claimed in claim 6, in which a conduit by-passes the pressure relief valve and said by-pass valve means is in said conduit.

8. An implement as claimed in claim 7, in which said conduit is closed in normal operation by a set screw.

9. An implement as claimed in claim 7, in which the overall length of the member can be adjusted by forcing fluid from one space to the other through the conduit and closing the conduit with said setting mechanism.

10. An implement as claimed in claim 6, wherein said piston has a rod that extends through only one of said spaces, and that space is in open communication with a reservoir.

11. An implement as claimed in claim 10, wherein said reservoir is mounted on said one end.

* * * * *